United States Patent Office 3,431,237
Patented Mar. 4, 1969

3,431,237
METHOD OF CURING EPOXY RESINS
Lawrence D. Harry, Midland, Mich., assignor to The Dow Chemical Company, Midland, Mich., a corporation of Delaware
No Drawing. Filed Mar. 27, 1967, Ser. No. 625,962
U.S. Cl. 260—47                                         1 Claim
Int. Cl. C08g 30/12, 30/14, 30/16

ABSTRACT OF THE DISCLOSURE

An epoxy resin prepared by the curing together of a poly loweralkylene glycol and a polyepoxide resin with an acid anhydride curing agent employing an accelerator therefor, is rendered more elastic by combining the polyepoxide and glycol with the accelerator, permitting the mixture to stand for 5 to 30 minutes or more as induction period, and then adding the curing anhydride material and completing the cure.

BACKGROUND OF THE INVENTION

The curing into infusible, essentially insoluble and essentially inflexible glassy resins of mixtures of polyepoxides and alkylene glycols using cyclic dicarboxylic acid anhydrides as curing agents and with various substances, such as amines, as accelerators, is well-known. The resulting resins are characteristically hard. Often they lack the flexibility necessary to withstand expansion and contraction that occurs in use under varying temperatures, and, especially when bonded to material of different thermal expansion properties, may fail when tested, as by a thermal test cycle, or put into use under conditions that impose temperature changes upon them.

SUMMARY OF THE INVENTION

According to the present invention, a cured epoxy resin of superior elasticity is prepared by first combining a polyglycol, a curing accelerator, and a polyepoxide resin precursor having a molecular weight of between 150 and 850, being of the type optionally prepared from the epoxidation of a novolak or of the type prepared from the condensation of a bisphenol and epihalohydrin, the latter being represented by a bis(epoxyloweralkoxyphenyl) lower alkane and derivatives thereof such as those prepared by partial cure thereof; or the ordinary substituted derivatives thereof; also bis - x,x' - (epoxyloweralkoxy) benzophenone and bis-x,x'-(epoxyloweralkoxy)diphenylsulfone: allowing the mixture to stand for an induction period of time, and thereafter adding an anhydride curing agent and finishing the cure.

The polyepoxide can be any bisphenol-epihalohydrin reaction product (or similar product otherwise prepared) having a molecular weight of from about 150 to about 850; the polyepoxy novolak can be any such material with a molecular weight from about 150 to about 700.

As polyglycol to be cured together with the polyepoxide, any poly loweralkylene glycol of molecular weight from about 250 to about 2,000 can be employed. Commercial polyethylene glycols and polypropylene glycols and their mixtures are satisfactory.

As curing accelerator to be added to the polyepoxide-polyglycol mixture and allowed to stand for a period of time prior to cure, any material known in the art of curing epoxy resins as a curing accelerator can be employed. Representative and well known accelerators include methylenedianiline, 2,3,6 - trimethylaminomethylphenol, tributylphosphine, sodium salicylate, lower alkylamines, benzyldimethylamine, ethylenediamine, and other amines, and the like.

As curing agent anhydride to be added to the mixture of the foregoing, after the induction interval of time, to complete the cure, any cyclic dicarboxylic anhydride can be used, and especially any of the anhydrides commonly used in the curing of epoxy resins, including hexahydrophthalic anhydride (the anhydride of 1,2-dicarboxylcyclohexane), 5-norbornene-x-methyl-2,3-dicarboxylic anhydride, the alkenylsuccinic anhydrides represented by dodecenylsuccinic anhydride; phthalic anhydride, maleic anhydride, tetrahydrophthalic anhydride, 1,4,5, 6,7,7-hexachloro-5-norbornene-2,3-dicarboxylic acid anhydride, and a polycyclic anhydride chemically similar to the foregoing and identified by its manufacturer by the designation "alkendic anhydride."

The components are to be taken in the proportions in which they are usually employed. Only the combining procedure and the resulting product differ. Thus, for each 100 parts of mixture of polyepoxide and polyglycol, the polyepoxide can be present in proportions from 30 to 90 parts, the polyglycol in proportions from 70 to 10 parts. The polyepoxide can be substantially pure material, or can be a blend. A blend is often preferred when preparing a fire-retardant material, or when using a liquid polyepoxide as liquefying solvent for a solid polyepoxide.

The accelerator can be employed in amounts from 0.25 to about 15 parts, usually from about 1 to about 5 parts, and the anhydride curing agent in the ratio from of from about 40 to about 100 parts all per hundred parts polyepoxide. Within these ranges, all of which are conventional, the choice of a particular formulation will be based upon the properties desired, speed of curing necessary, and other considerations which can be ascertained by simple range-finding tests.

In common with the curing of polyepoxides to obtain epoxy resins, in general, it is within the scope of the present invention to incorporate a filler substance within a curable resin or component thereof prior to completion of compositing. Any filler substance desired can be employed. Such filler substances include granulated or finely ground polymeric materials including the same or other epoxy resins in cured condition; asbestos, talc, silica, powdered aluminum, and the like chosen, of course, with regard for their properties in the environment of the cured epoxy resin. Such properties will include the viscosity of the resulting uncured mixture; rate of cure; thermal and electrical conductivity of the finished product, machineability, adhesion and the like.

The mixing and formulating of the finished, curable composition is carried out at temperatures as low as are convenient; in any case between about 20° and 120° C. The resulting curable formulation gels upon standing for a period of time at temperatures in the range of about 50° to about 100° C. and requires a finish cure treatment, such as heating on the order of an hour to two hours at 150° C. to achieve full strength.

When prepared according to the present invention, namely, that the accelerator, represented by an amine, is first blended with the polyepoxide and glycol mixture and allowed to stand for an induction interval of time and the mixture thereafter cured by the addition of a curing anhydride and subsequent heating, the resulting product is tested and compared with related products prepared without benefit of the present invention by a temperature cycle, characteristically of 4.5 hours. The cycle consists of a two hour interval at 250° F. followed by a 15 minute interval at 75° F., a third interval of two hours at —40° F., and a final interval of fifteen minutes at 75° F. Characteristically, compositions prepared by the simultaneous or substantially simultaneous addition of anhydride curing agent and amine accelerator or by the addition of anhydride before addition of the amine accelerator, in the manner of the prior art, fail, by fracture, during one or two cycles of the sort described; characteristically, compositions prepared according to the present invention withstand, without serious defect, five or more cycles as described.

The tendency to fail in such thermal cycle is greatly enhanced when the epoxy is, as a potting or encapsulating material, intimately bonded to and enclosing or substantially enclosing something of thermal properties such as conductivity and coefficient of expansion, different from those of the epoxy. Such case is commonly encountered in the industrial use of such cured epoxy when it is employed, for example, as potting material to protect and enclose an electric coil or the like. In such application, it is usually of little concern that the epoxy be flexible in the sense of an elastomer; it is of great importance that it withstand normal stress incident to its own thermal properties and those of the thing it encloses.

DESCRIPTION OF THE PREFERRED EMBODIMENTS

Example 1

The present example represents the practice of the prior art for purposes of comparison. All parts specified are parts by weight. 60 parts of 2,2-bis(4-(2,3-epoxypropoxy)phenyl)propane of good industrial purity ("the diglycidyl-ether of bisphenol A") were mixed and blended with 40 parts of a polypropylene glycol of an average of about 12.7 recurring propylene oxide units, $\alpha,\omega$-terminated with hydroxyl groups, to obtain a curable polyepoxide material. To this mixture was then added 60 parts of the cyclic anhydride of 1,2-cyclohexanedicarboxylic acid ("hexahydrophthalic anhydride") and 1.5 parts of benzyldimethylamine, together with 200 parts substantially dry silica flour as filler. The blending and addition of all components was carried out at a temperature between 20° C. and 120° C.

An electric coil consisting essentially of a continuous winding of copper wire on a supporting core, enclosed within an outer aluminum container, the said container having feet on the ends of each of three projecting legs approximately ½ inch long, was placed, standing on the said feet, in a box mold of which the interior defined approximately a 4 inch cube. The curable, polyepoxide mixture including silica flour hereinbefore described, was placed in the mold and disposed around and in intimate contact with all exposed surfaces of the said coil, except the bottoms of the said feet which were left uncovered and might serve as contact terminals. The resulting mixture was thereafter held at a temperature from 50° C. to 100° C., for approximately an hour, during which time the polyepoxide formulation reacted, and became a firm, unyielding gel by partial crosslinking of the components. In this condition, then the entire structure was cured by heating two hours at 150° C. to obtain an infusible, substantially insoluble, glassy, continuous, hardened epoxy resin coating having a minimum wall thickness of approximately ½ inch on and over all sides of the said coil except, as noted, for the bottoms of feet.

Example 2

This example describes the results obtained when the prior art cured epoxy resin was tested by thermal cycling.

The encapsulated electric coil prepared as described in Example 1 was tested by exposure to one complete 4.5 hour temperature cycle. Beginning at room temperature, it was initially heated and maintained for two hours at a temperature of 250° F. At the end of the said two hours, it was placed in a temperature of 75° F. and maintained thereat for fifteen minutes. At the end of the said fifteen minutes it was placed in a temperature of −40° F. and held thereat for two hours, at the end of which time it was removed from the region of −40° F., and held for fifteen minutes at 75° F. At the conclusion of the said second fifteen minute period, the structure was examined and found to have developed cracks through its surface proceeding inward to and abutting the surface of the coil within. Any such crack—or any visible surface failure—was regarded as a failure to pass the single temperature cycle test.

Example 3

The present example illustrates the present invention. 60 parts 2,2-bis(4-(2,3-epoxypropoxy)phenyl)propane are intimately mixed and blended uniformly, at a temperature in the range between about 20° C. and 120° C., with 40 parts of a polypropylene glycol averaging about 12.7 recurring propylene oxide units and $\alpha,\omega$-terminated with hydroxyl groups to obtain a polyepoxide precursor material. 1.5 parts benzyldimethylamine are then mixed and stirred intimately into the polyepoxide precursor mixture, and, upon the achievement of a uniform dispersion of the amine in the polyepoxide, the resulting mixture is allowed to stand for a fifteen minute induction period. During this time, no visible change takes place. At the end of this time, there are added 60 parts of the cyclic anhydride of 1,2-dicarboxylcyclohexane. It is pointed out that the composition of this example uses the same proportions of the same components as Example 1; only the induction period of the curable mixture with accelerator prior to addition of curing anhydride is different, as to preparation. Finally, the anhydride is intimately mixed and blended to obtain a homogeneous total composition.

In procedures essentially identical with those described, foregoing, the composition is mixed with 200 parts substantially dry silica flour, and the resulting product positioned in a mold of which the interior defines a 4 inch cube, within which mold is positioned an electric coil composed primarily of a winding of copper wire on a supporting core and enclosed within an aluminum shell, the said shell being produced, in part, as three ½ inch legs terminating in feet. The coil is positioned within the mold in such manner as to stand on the said feet.

The curable polyepoxide mixture is disposed intimately upon, over, and around the coil and annexed housing, to enclose all parts of it within a cover of approximately ½ inch thickness at all places except at the said feet which are essentially uncovered. Thereafter, the coated coil is held for an hour at a temperature from 50° C. to 100 C., during which time it sets to form a firm, unyielding, lightly cross-linked gel; in this condition the entire structure is placed in a curing oven and heated for two hours at 150° C. to obtain a hard, glassy, solid, infusible, substantially insoluble resinous potting solid plastic material. The superficial appearance of the resulting product is essentially indistinguishable from the product of Example 1, foregoing.

Example 4

In the present example, the potted coil prepared according to the present invention as represented in Example 3 was tested in a thermal cycle test as described in Example 2. Upon the completion of each thermal cycle, the coil and plastic encasement of it were closely examined for evidence of incipient cracking or crazing of the surface of the plastic solid potting material. There being no evidence of failure upon the completion of the first cycle, the coil together with plastic enclosure was again challenged by repeating the same cycle, and reexamined. Again, no evidence of failure was observed. The thermal cycle was replicated a total of five times, and, upon the completion of the fifth cycle, the coil and epoxy coating were found to be free of any evidence of even incipient failure, and thermal cycle testing was discontinued.

Example 5

In the present example, 25 parts of a polyepoxy novolak of average molecular weight about 590 and an average epoxide equivalent weight of about 180 are warmed and blended with 15 arts of relatively pure 2,2-bis(4-(2,3-epoxypropoxy)phenyl)propane to obtain a mixed curable polyepoxide as a viscous liquid at room temperature. This mixture is combined at a temperature in the range between about 20° and 120° C., with 40 parts of a polyethylene glycol averaging about 45 recurring ethylene oxide units and $\alpha,\omega$-terminated with hydroxyl groups to obtain a mixed polyepoxide precursor material. In further operations, 5 parts sodium salicylate are mixed and stirred intimately into the polyepoxide precursor mixture, and, upon the achievement of a uniform dispersion of the agent in the polyepoxide, the resulting mixture is allowed to stand for a fifteen minute induction period. During this time, no visible change takes place. At the end of this time, there are added 60 parts of dodecenylsuccinic anhydride. Finally, the anhydride is intimately mixed and blended to obtain a homogeneous total composition.

In procedures essentially identical with those described, foregoing, the composition is mixed with 200 parts substantially dry silica flour, and the resulting product positioned in a mold of which the interior defines a 4 inch cube, within which mold is positioned an electric coil composed primarily of a winding of copper wire enclosed within an aluminum shell, the said shell being produced, in part, as three ½ inch legs terminating in feet. The coil is positioned within the mold in such manner as to stand on the said feet. The curable polyepoxide mixture is disposed intimately upon, over, and around the coil and annexed housing, to enclose all parts of it within a cover of approximately ½ inch thickness at all places except at the said feet which are essentially uncovered. Thereafter, the coated coil is held for about an hour at a temperature from 50° C. to 100° C., during which time light crosslinking takes place and the composition becomes a firm, unyielding gel. In this condition it is placed in a curing oven and heated for two hours at 150° C. to obtain a hard, glassy, solid, infusible, substantially insoluble resinous potting solid plastic material. The superficial appearance of the resulting product is essentially indistinguishable from the product of Example 1, foregoing.

Example 6

In the present example, the potted coil prepared according to the present invention as represented in Example 5 was tested in a thermal cycle test as described in Example 2. Upon the completion of each thermal cycle, the coil and plastic encasement of it were closely examined for evidence of incipient cracking or crazing of the surface of the plastic solid potting material. There being no evidence of failure upon the completion of the first cycle, the coil together with plastic enclosure was again challenged by repeating the same cycle, and re-examined. Again, no evidence of failure was observed. The thermal cycle was replicated a total of five times, and, upon the completion of the fifth cycle, the coil and epoxy coating were found to be free of any evidence of even incipient failure, and thermal cycle testing was discontinued.

It is emphasized that the enhanced resistance to thermal shock damage, according to the present invention, is achieved solely through the changed procedure. The curing accelerator, usually the component present in smallest amount, is added to the curable polyepoxide mixture and allowed to stand for an induction period of time, from 5 to 30 or more minutes, after which the curing cyclic anhydride is added, together with filler, if employed, the uncured resin is disposed as it is to harden, and the cure carried to completion. The range of accelerators, curing agents, polyepoxides and such other additives as polyglycols is, otherwise, that of the prior art.

I claim:
1. In the process of curing a composition comprising a polyepoxide containing an average of more than one 1,2-epoxide group per molecule to be cured to yield an epoxy resin by reaction in the presence of a cyclic dicarboxylic anhydride curing agent, a curing accelerator, and a polyglycol in an amount adapted to be consumed by reaction in the curing of said polyepoxide, the improvement which consists of adding the curing accelerator to and thoroughly mixing said accelerator and polyglycol with the polyepoxide composition before adding the anhydride curing agent, permitting the resulting mixture to stand for at least a five minute induction period of time, and thereafter adding anhydride curing agent.

References Cited

UNITED STATES PATENTS 2,947,717  8/1960  Belanger et al.

WILLIAM H. SHORT, *Primary Examiner.*

T. D. KERWIN, *Assistant Examiner.*

U.S. Cl. X.R.

260—2, 37, 49, 59, 75, 78.4, 830, 835